United States Patent [19]
Berger

[11] 3,850,802
[45] Nov. 26, 1974

[54] SELF-CLEANING FILTER
[75] Inventor: Benjamin Berger, Galilee, Israel
[73] Assignee: Bermoid Irrigation Controls, Galilee, Israel
[22] Filed: Jan. 18, 1973
[21] Appl. No.: 324,806

[52] U.S. Cl.................. 210/106, 210/413, 210/447
[51] Int. Cl....................... B01d 27/12, B01d 29/39
[58] Field of Search .......... 210/106, 108, 238, 413, 210/414, 447, 452

[56] References Cited
UNITED STATES PATENTS

| | | | |
|---|---|---|---|
| 2,606,663 | 8/1952 | Blackman et al. | 210/413 X |
| 3,221,879 | 12/1965 | Irving | 210/106 |
| 3,278,031 | 10/1966 | Rosaen | 210/106 |
| 3,608,722 | 9/1971 | Picard | 210/108 |
| 3,623,607 | 11/1971 | Loos | 210/106 |

Primary Examiner—Samih N. Zaharna
Assistant Examiner—Robert H. Spitzer
Attorney, Agent, or Firm—Toren, McGeady and Stanger

[57] ABSTRACT

A water filter is disclosed which has a casing with a tubular filter element, the casing being provided with an inlet port and an outlet port, with a chamber partitioned off from the interior of the casing being provided above the casing and forming a hydraulic cylinder. A piston moves within the cylinder and the rod of the piston extends to the interior of the casing into the space enclosed by the tubular filter. At least one brush is affixed to the lower end of the piston rod and has a configuration to fit into the interior of the tubular filter. A four-way valve is provided which directs flow of water from the casing alternatingly to the top of and below the piston. The four-way valve is governed by a mechanical switch-over arrangement which is controlled by the up and down movement of the piston resulting from the alternating flow of the water. The four-way valve establishes communication alternatingly between the space above and below the piston and the ambient atmosphere, respectively.

3 Claims, 1 Drawing Figure

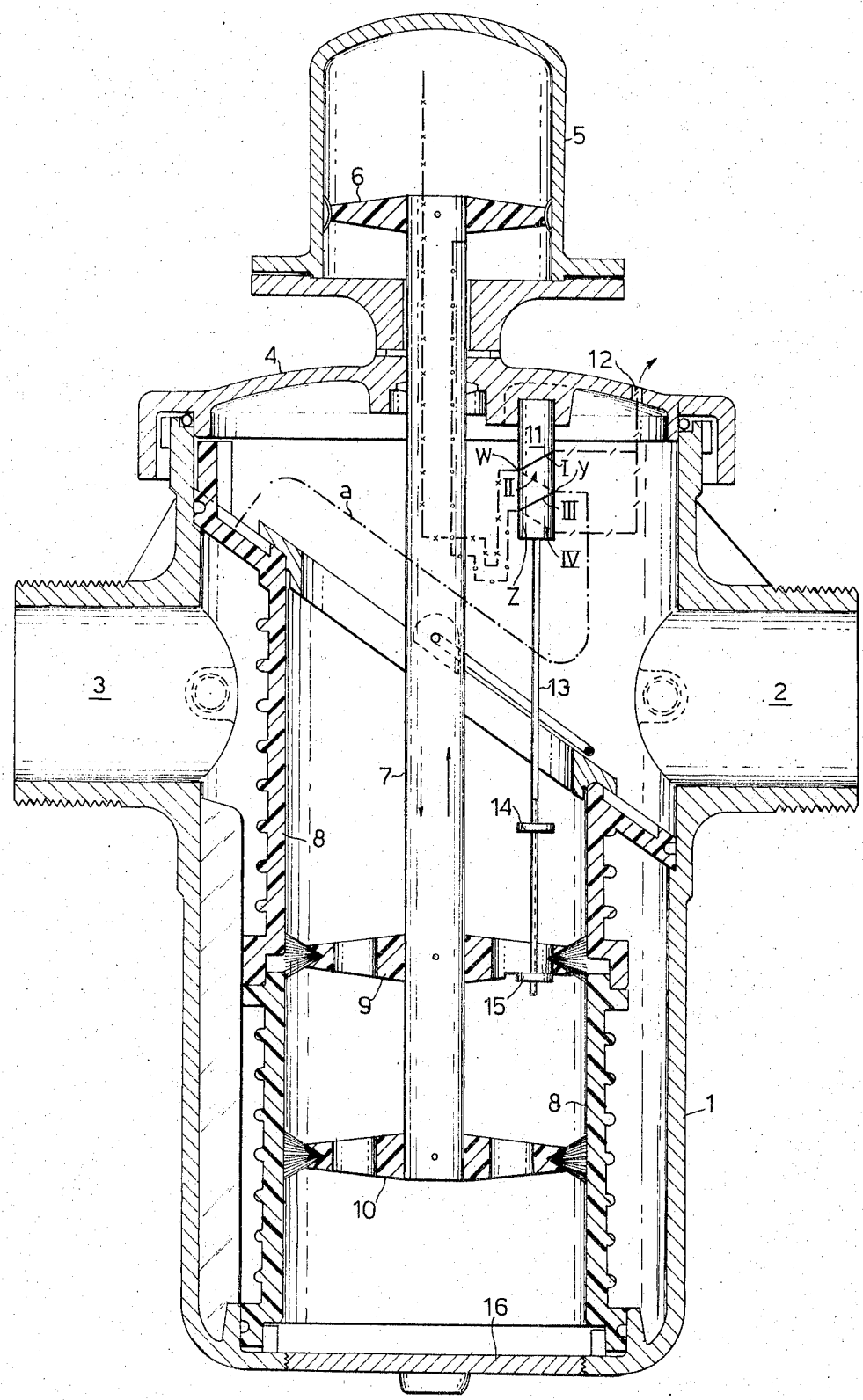

3,850,802

SELF-CLEANING FILTER

SUMMARY OF THE INVENTION

The present invention relates to a filter — more particularly a water filter — of the type which comprises an outer casing and a tubular or bucket shaped filter positioned in the said casing, an inlet port and an outlet port being provided on the casing. Such filters are described in our copending applications Ser. No. 324,805, filed Jan. 18, 1973, and Ser. No. 324,807, filed Jan 18, 1973 and therefore no further identification of the type will be required.

It is the object of this invention to provide means which perform a continuous and automatic cleaning during operation of the filter, i.e., during all times when water flows through the casing which is inserted into a water supply line, as is customary.

According to the invention there is provided a filter comprising a casing with a tubular filter element within said casing, the casing having an inlet port and an outlet port, a chamber, partitioned off from the interior of the casing being provided preferably above the casing and forming an hydraulic cylinder, a piston plying within the said cylinder, the rod of the piston extending to the interior of the casing, into the space enclosed by the tubular filter, at least one brush being affixed to the lower end of the piston rod and having an outline to fit into the interior of the tubular filter, a four-way valve being provided directing flow of water from the casing alternatingly to the top of and below the piston, the said four-way valve being governed by a mechanical switch-over arrangement controlled by the up or down movement of the piston resulting from the alternating flow of water, the said four-way valve further establishing communication alternatingly, between the space above and below the piston and the atmosphere respectively.

The invention will now be described with reference to the annexed drawing showing a filter equipped with the new means, in a schematical way, the drawing being an elevational section.

The filter comprises the conventional casing 1 which has an inlet port 2 and an outlet port 3. These ports — as customary — are spigots provided with external screw threads for connection to sections of the water feed line. On top of the casing 1, i.e., on top of its removable lid 4 there is provided a closed chamber 5, which will be referred to as the "drive chamber." In the drive chamber plies a piston 6, to which a piston rod 7 is affixed. The piston rod 7 extends through lid 4 into the interior of the casing, concentrically with the tubular filter 8 placed therein. To the lower end of the rod 7 are affixed two brushes 9 and 10 having a peripheral outline to fit into the tubular filter 8.

From a point near the outlet 3, i.e., where already filtered, clean water would be available a conduit (say a pipe or hose) indicated by dash dotted lines and the letter $a$ leads to a multi-way valve 11. In this valve are provided four passages I, II, III and IV. Passage I joins passage II at a common point $w$, passage II joins passage III at a common point $y$ and passage III joins passage IV at a common point $z$. From point $w$ a conduit indicated by an $x-x$- line and referred to as the X-line leads into the uppermost region of the drive chamber 5, to a level which is higher than the extreme height to which the piston 6 would rise. From point $z$ a line indicated by $o-o-$ and referred to as the O-line leads into the drive chamber 5 to a level which is below the lowermost level to which the piston 6 might sink. Passages I, II, III and IV are furthermore in communication with the atmosphere via a connection indicated by a -/-/-/ line, leading to a vent 12. The valve bodies (not shown, and being of conventional design) within the valve 11 are governed for alternate closing and opening passages I, III and II, IV by a rod 13, which has two abutments 14 and 15, positioned above and below the brush 9. These two abutments are washers or nuts screwed on the lower screw threaded end of the rod 13, so that the distance between them can be adjusted. The casing 1 is closed at its bottom by a removable bottom disc 16.

The new arrangement functions as follows:

Supposing that the filter is inserted into a feed line and water starts flowing into the port 2, it will pass the filter 8, in a known manner and flow out through outlet 3, but part of the water fill flow through conduit $a$, via point $y$, passage III, point $z$ and the O-line into the drive chamber 5, below the piston, causing this latter to rise. The amount of air above the piston can escape through the X-line, via point $w$, passage I and the -/-/-/- line to vent 12 and into the open. With the ascent of the piston 6 the rod 7 moves axially in upward direction until brush 9 strikes against the abutment 14 moving rod 13 upwardly which causes a switching over of the valve bodies in the valve 11. While previously the passages I and III — drawn in full lines — were open, now the passages II and IV — drawn in broken lines — are open. Accordingly, the flow from conduit $a$ now passes via point $y$, passage II, point $w$ into the X-line to the uppermost part of the drive chamber 5, thereby causing the piston 6 to descend. As a consequence the brush 9 strikes abutment 15, again switching over the passages in valve 11, reversing the flow and causing the piston to rise again. While the piston descends, the water below it flows out through the O-line, via point $z$, passage IV into the -/-/- line and out into the open through vent 12.

It will be seen that in the manner, as long as there is a flow of water through the casing 1, the two brushes move up and down, automatically cleaning the filter and preventing dirt to deposit on the filter screen. For removing accumulated dirt, the bottom 16 is unscrewed, to allow dirt to drop out.

The tubular filter may be circular or square, the brushes being of a corresponding outline. The drive chamber 5 may be formed integrally with the casing 1 and partitioned therefrom by an intermediate wall.

The tubular filter 8 shown in the drawing is of the type described and claimed in our copending application Ser. No. 324,807 filed Jan. 18, 1973. It is clear that the invention applies equally to different type filters.

What is claimed is:

1. A filter comprising an upwardly extending casing, an upwardly extending tubular filter element positioned within said casing, an inlet port and an outlet port located in the upwardly extending walls of said casing and said ports spaced apart on said casing with said filter element positioned between said inlet port and outlet port so that water flowing into said casing through said inlet port must pass through the walls of said filter element before exiting through said outlet port, wall means mounted on the upper end of said casing and forming a closed chamber separated from the interior of said casing, said closed chamber forming a hydraulic cylinder having its cylindrical axis extending in the upwardly extending direction of said casing, a piston positioned within and movably displaceable through said hydraulic cylinder in the direction of its cylindrical axis and dividing the interior of said closed chamber into an upper chamber and a lower chamber, a rod secured to said piston and extending from said closed chamber into said casing and being arranged therein within the interior of said tubular filter element with the axis of said rod in approximately parallel relation with the tubular axis of said filter element, at least one brush fixed to the lower end of said piston rod and arranged with its circumferential periphery in contact with the interior surface of said filter element, first conduit means connecting the interior of said casing with said upper chamber, second conduit means connecting the interior of said casing with said lower chamber, a four-way valve in connection with said first and second conduit means for regulating the flow of water from within said casing into said upper and lower chambers in said closed chamber, and a mechanical switch-over means operatively associated with said four-way valve and operatively connected to said piston rod and being controlled by the up and down movement of said rod within said casing for selectively directing the flow of water from said casing into one of said upper and lower chambers for effecting the displacement within said closed chamber of said piston, said casing being open at its upper end to the atmosphere and said first and second conduits arranged to provide communication alternatively between the atmosphere and the water in said casing with said upper and lower chambers.

2. A filter, as set forth in claim 1, wherein said mechanical switch-over means comprises a push rod located in said casing, abutments secured to said push rod and spaced apart in the axial direction of movement of said rod in said casing, said abutments located in the path of movement of said brush on said rod and arranged to control the alternating flow through said four-way valve by causing said valve to switchover when said brush reaches a selected end position in its path of travel with said rod.

3. A filter as claimed in claim 2, characterized thereby that the position of said abutments on said rod is adjustable.

* * * * *

UNITED STATES PATENT OFFICE
CERTIFICATE OF CORRECTION

Patent No. 3,850,802               Dated November 26, 1974

Inventor(s)  Benjamin Berger

It is certified that error appears in the above-identified patent and that said Letters Patent are hereby corrected as shown below:

In the heading of the patent:

The name of the assignee should read:

--Bermad Irrigation Controls-- insert:

--[30] Foreign Application Priority Data

August 3, 1972   ISRAEL...........40046--

Signed and Sealed this eighth Day of June 1976

[SEAL]

Attest:

RUTH C. MASON
Attesting Officer

C. MARSHALL DANN
Commissioner of Patents and Trademarks